J. R. ROSE.
PROCESS OF PRODUCING CARBON AND GASEOUS FUEL.
APPLICATION FILED DEC. 26, 1918.

1,352,086.

Patented Sept. 7, 1920.
3 SHEETS—SHEET 1.

J. R. ROSE.
PROCESS OF PRODUCING CARBON AND GASEOUS FUEL.
APPLICATION FILED DEC. 26, 1918.

1,352,086.

Patented Sept. 7, 1920.

3 SHEETS—SHEET 2.

Inventor;
James R. Rose,
By Hull, Smith, Buck & West,
Attys.

J. R. ROSE.
PROCESS OF PRODUCING CARBON AND GASEOUS FUEL.
APPLICATION FILED DEC. 26, 1918.
1,352,086.
Patented Sept. 7, 1920.
3 SHEETS—SHEET 3.
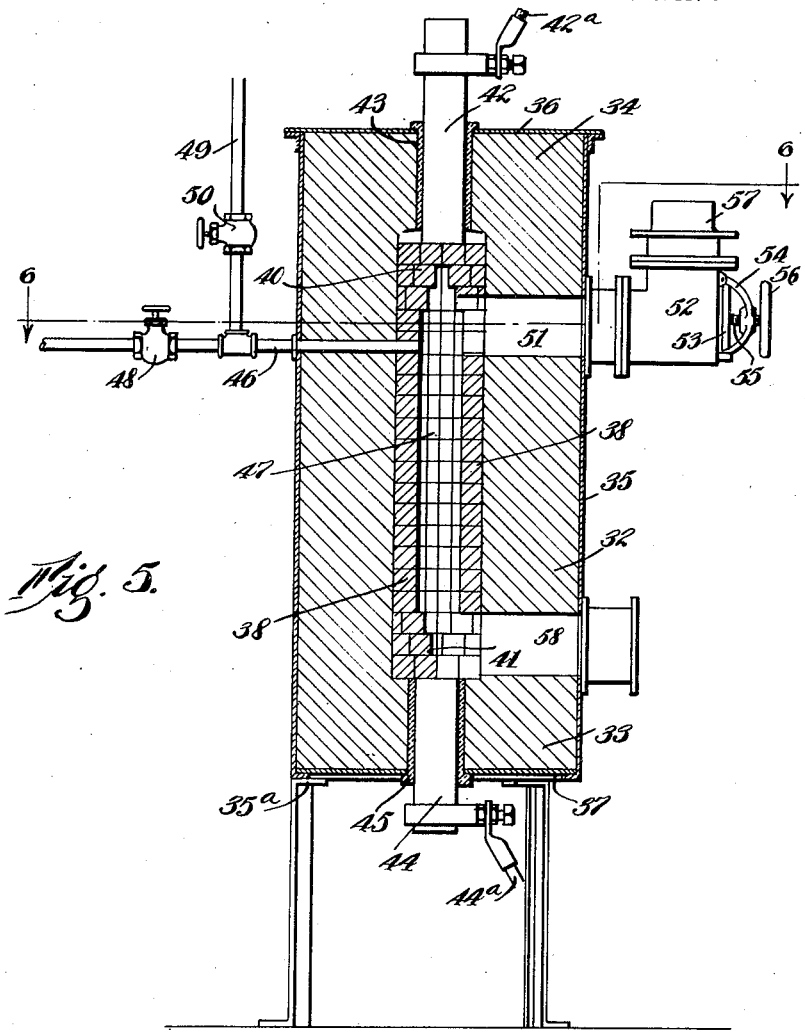
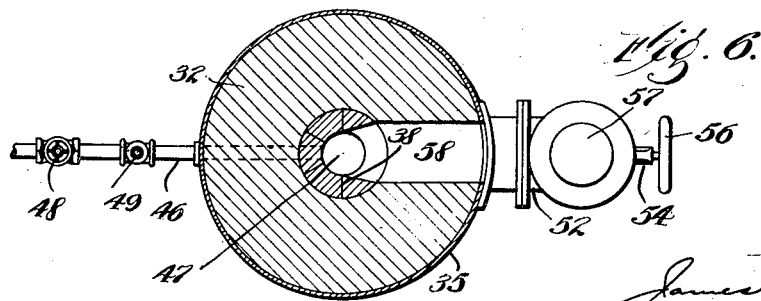

UNITED STATES PATENT OFFICE.

JAMES R. ROSE, OF EDGEWORTH, PENNSYLVANIA.

PROCESS OF PRODUCING CARBON AND GASEOUS FUEL.

1,352,086.

Specification of Letters Patent.

Patented Sept. 7, 1920.

Application filed December 26, 1918. Serial No. 268,390.

*To all whom it may concern:*

Be it known that I, JAMES R. ROSE, a citizen of the United States, residing at Edgeworth, in the county of Allegheny and State of Pennsylvania, have invented a certain new and useful Improvement in Processes of Producing Carbon and Gaseous Fuel, of which the following is a full, clear, and exact description, reference being had to the accompanying drawings.

Figures 1, 2:
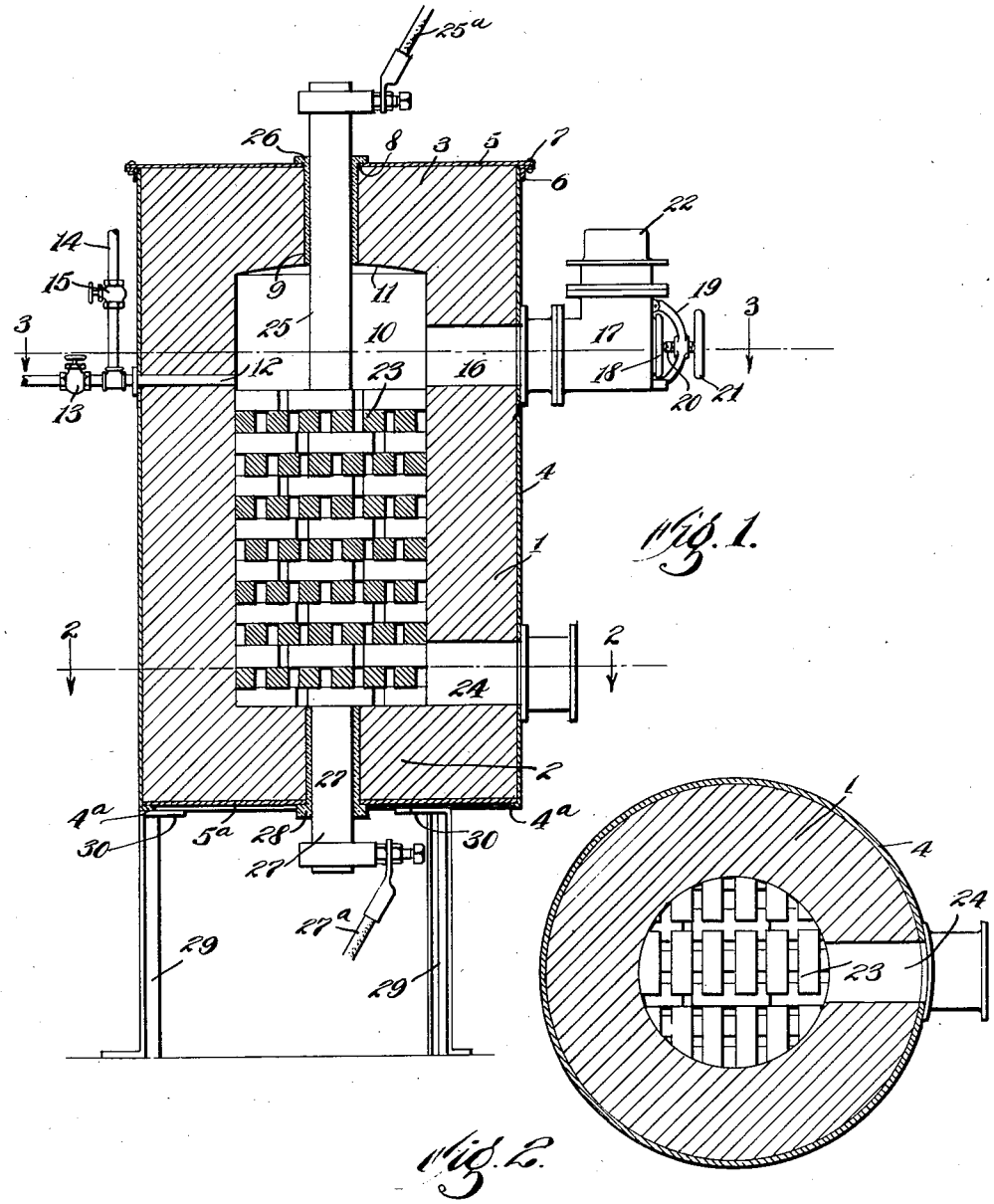
Figure 3:
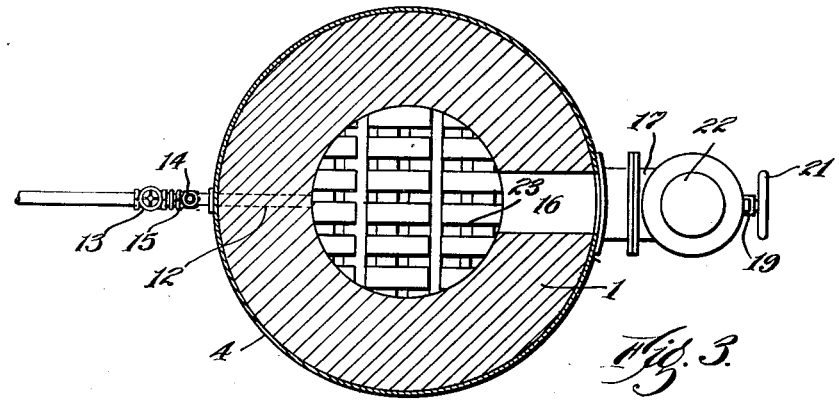
Figure 4:
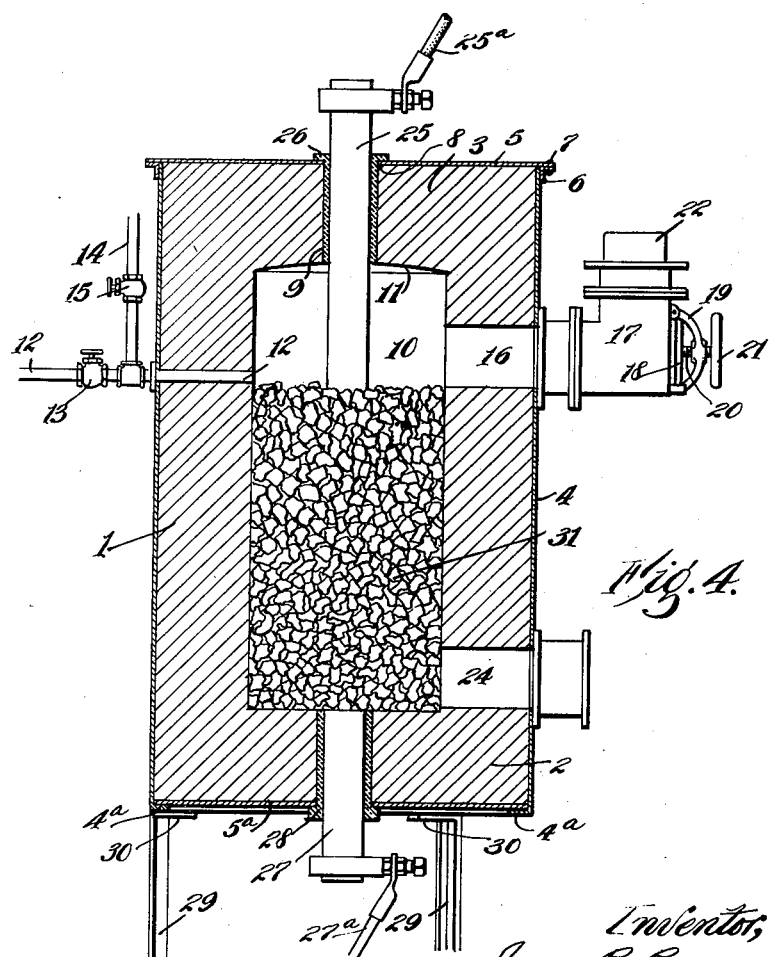

This invention relates to a process of producing carbon and a gaseous fuel, and particularly to the production of the same in and through the employment of electrical treatment. The general object of the invention is to enable the carbon and gaseous fuel to be produced in a particularly efficient and economical manner. I realize the foregoing object in and through the employment of the apparatus shown in the drawings forming part hereof, wherein: Figure 1 represents a central vertical sectional view through an electrical furnace; Fig. 2 a sectional view corresponding to the line 2—2 of Fig. 1; Fig. 3 a sectional view corresponding to the line 3—3 of Fig. 1; Fig. 4 a view, similar to Fig. 1, of a modification of the furnace; Fig. 5 a view, similar to Fig. 1, of a further modification of the furnace; and Fig. 6 a sectional view corresponding to the line 6—6 of Fig. 5.

Describing by reference characters the various parts illustrated in Figs. 1 to 3 inclusive, 1 represents the cylindrical wall of a furnace or a generator, said wall being of refractory material capable of withstanding the temperature due to the employment of an electric arc. 2 denotes the bottom wall of the furnace and 3 the top wall of the same, the walls 2 and 3 being also made of such refractory material and all of the walls being inclosed by a shell, preferably of sheet steel. 4 denotes the side wall of said shell and 5 the top, said top being shown as secured to the wall 4 as by means of an angle iron 6 carried by the top of said wall and bolts 7 uniting the top 5 to the horizontal flange of the angle iron. The top 5 is provided with a central opening 8 (preferably circular) and registering with a similarly shaped opening 9 in and extending through the wall 3. The bottom 5ª is constructed similarly to the top 5 and is conveniently retained in place by a flange 4ª on the bottom of the wall 4.

Within the walls 1, 2 and 3 is a central chamber 10, said chamber being preferably cylindrical and having its upper wall slightly arched as shown at 11.

12 denotes a pipe for conducting to the upper portion of the chamber 10 a hydrocarbon fluid, preferably methane or natural gas, said pipe being provided with a valve 13 by means of which the supply of such fluid may be varied in accordance with the temperature conditions within the said chamber and the grade or quality of carbon which it is desired to produce. Under certain conditions, it may be advisable to supply a limited quantity of oxygen, along with the said fluid. For this purpose, a pipe 14 is shown as communicating with the pipe 12 between the valve 13 and the furnace shell, there being a valve 15 by means of which the rate of supply of the air can be varied as occasion may require. Extending from the opposite side of the chamber 10 from the pipe 12 is a pressure-relief connection 16. This connection comprises an elbow 17, said elbow being provided with a clean-out opening at the bottom of the horizontal branch thereof, said clean-out opening being provided with a cover 18 secured in place by a hinged yoke 19 and a screw 20 mounted in said yoke and having an operating wheel 21. At the top of the elbow is a weighted valve 22 which, should the pressure within the chamber 10 exceed a predetermined amount, will automatically lift and relieve such pressure.

The space beneath the pipe 12 and outlet connection 16 is filled with a mass of material capable of conducting electricity while opposing sufficient resistance to result in heating the same to a temperature sufficient to dissociate the hydrocarbon fluid. This material is shown as made up of bricks 23 arranged in checker-work formation and providing tortuous passageways for the fluid as it passes to the outlet connection 24 at the bottom of the chamber. From this outlet connection, a conduit (not shown) extends to a carbon separator of standard construction and thence to a suitable receptacle for the gas discharged from the chamber. The bricks 23 are preferably of carbon.

25 denotes a carbon electrode which is inserted through the top of the furnace and the lower end whereof is in contact with the upper course of bricks 23, said electrode being mounted within an insulating bushing 26 which is inserted in the openings 8 and 9 and being provided with a conductor 25ª for electric current. A similar carbon electrode 27 projects through the bottom of the furnace as far as the bottom of the chamber 10 where it contacts with the bottom course of bricks 23. This electrode is mounted in an insulating bushing 28 interposed between the same and openings provided in the bottom of the shell and the bottom of the wall 2 of the furnace and is provided with a conductor 27ª for electric current. The furnace is shown as supported by a plurality of legs 29 each having a flat bracket 30 at the top thereof which engages the bottom of the furnace.

In operation, the hydrocarbon fluid, which as stated is preferably methane or natural gas, is supplied through the pipe 12 to the chamber 10 and passes through the checker work to the gas outlet connection 24. This checker work will have been previously heated by current supplied through the electrodes and the checker work material, to a temperature preferably slightly above the ignition point of the hydrocarbon fluid. The effective temperature to which this fluid is subjected in its passage through the checker work may, and preferably will, be controlled by the rate of supply of such fluid. In general, the higher the temperature to which the hydrocarbon fluid is raised in its passage through the checker work the greater will be the proportion of the carbon deposit and the lower the proportion of the gaseous fuel discharged through connection 24. For instance, by raising the temperature of the fluid to about 2,000° F., a gas containing approximately 85 per cent. hydrogen and 15 per cent. of other hydrocarbons of high heating value (said gas being known to the trade under the name of "carbo-hydrogen") will be produced together with a certain proportion of free, finely divided carbon. At a temperature of about 1,000° F., a comparatively small proportion of pure, finely divided high grade, black carbon will be produced, the gas containing a higher proportion of hydrocarbons of high heating value. When the temperature of the hydrocarbon is raised to about 3,000° F., practically all of the carbon constituent is precipitated, and the resultant gas is substantially pure hydrogen; where the hydrocarbon fluid is raised to a temperature about 1800° F., the carbon precipitated will be lighter in color than if produced at the lower temperatures. The gas discharged through the outlet connection will always contain a preponderating proportion of hydrogen.

Where oxygen is introduced in connection with the hydrocarbon fluid, the gas will be partially burned in its passage through the furnace, producing a deep black form of carbon. If air is used instead of pure oxygen the gas produced will be unsuited for cutting and welding purposes. By arranging the resistance material in the manner shown, owing to the more or less imperfect contact between the units thereof, a myriad of arcs will be produced. The mass will be slowly heated and the hydrocarbon fluid treated will be exposed not only to the heat of the various units of the mass but to the multiplicity of arcs formed therebetween. By this mode of treatment, I am enabled to effect a great saving in the amount of current required for the conversion of the hydrocarbon fluid into the gaseous and carbon constituents over the employment of a mere arc between ordinary carbon arc electrodes.

In Fig. 4, there is shown a modification of my invention wherein the construction of the furnace, the arrangement of the gas and air supply, pressure relief connection, outlet connection, and carbon electrodes are substantially identical with the corresponding parts in Figs. 1 to 3 inclusive; and the parts referred to are identified by the same reference characters as were employed in connection with Figs. 1–3. In Fig. 4, however, instead of using a brick checker-work for the interior of the chamber 10, I employ fragments of resistant material, preferably carbon, indicated at 31. The electrodes 25 and 27 contact respectively with the top and bottom of this mass of resistance material. This arrangement of resistance material will result in the production of a multiplicity of arcs when current is supplied therethrough from the electrodes and the fluid in its passage through the mass will be dissociated in the manner described hereinbefore.

In Figs. 5 and 6 I have shown another modification of the apparatus of my invention. In these views, 32 denotes the refractory side wall, 33 the refractory bottom wall and 34 the refractory top wall of the furnace, the sheet steel casing being indicated at 35, 36 and 37.

It will be noted that the central chamber provided within the refractory walls 32, 33 and 34 is of small cross-sectional area as compared with the chamber 10. The wall of this chamber, which is preferably cylindrical, is lined with resistance material, said resistance material being conveniently formed of segmental carbon bricks or blocks, indicated at 38. This lining extends nearly to the top of the chamber 39 and is built into arch shape at the top and bottom, as indicated at 40 and 41. The upper electrode 42 projects through openings in the cover 36 and the wall 34 and is provided with a conductor 42ª for electric current, there being an insulating bushing 43 surrounding such electrode and the lower end of the electrode contacting with the top of the arch 40.

The lower electrode 44 projects through similar openings in the bottom of the shell and the bottom wall 33, through an insulating bushing 45, and contacts at its upper end with the bottom of the arch 41. It is provided with a conductor 44ª for electric current.

46 denotes the pipe through which the hydrocarbon fluid is introduced into the central flue 47 provided within the resistance 38, said pipe being shown as extending through the said resistance and communicating with the upper end of said flue. This pipe is provided with a valve 48 for controlling the supply of hydrocarbon therethrough; and an air supply pipe 49 having a valve 50 therein communicates with the pipe 46 between the valve 48 and the furnace wall. 51 denotes the pressure relief connection having the elbow 52, clean out valve 53, swinging yoke 54, screw 55, hand wheel 56, and weighted valve 57, similar to the parts 16—22 inclusive on Fig. 1. 58 denotes the gas outlet connection, similar to the connection 24 and extending through the wall 32 and the resistance material 38, whereby the gas within the flue 47 may be taken from the bottom of said flue and delivered to the carbon separator and afterward to the storage reservoir.

In the operation of the furnace shown in Figs. 5 and 6, the resistance material 38 will be heated in the same manner as is the case with the prior embodiments of my invention. As is the case with the preceding embodiments of my invention, a multiplicity of arcs will be produced between the carbon bricks or blocks, and the mass of the resistance formed by such bricks may be heated to incandescence. The hydrocarbon fluid, either mixed or unmixed with air, will be conducted through the narrow flue 47, being exposed in its passage through said flue to the incandescent material and the arcs between the portions thereof, whereby carbon will be produced and gas discharged from the outlet connection 58 in the manner described hereinbefore.

In practice, the electrodes 25, 27 and 42, 44, are of large cross-sectional area so that, by their removal, access may be had to the interior of the chambers 10 and 47, as well as by the removal of the valves or closures 18 and 53.

Having thus described my invention, what I claim is:—

1. The process which comprises subjecting a mixture of hydrocarbon fluid, together with oxygen in proportion to produce incomplete combustion thereof, to discontinuous resistance material in an electric circuit, whereby the said fluid is dissociated into carbon and a gas containing a preponderating amount of hydrogen.

2. The process which comprises conducting a hydrocarbon fluid, together with oxygen insufficient to support complete combustion thereof, in contact with a discontinuous mass of resistance in an electric circuit and heated thereby, whereby said fluid is dissociated into carbon and a gas containing a preponderating proportion of hydrogen.

3. The process which comprises conducting a hydrocarbon fluid, together with oxygen insufficient to support complete combustion thereof, through a discontinuous mass of resistance interposed in an electric circuit and heated thereby, whereby said fluid is dissociated into carbon and a gas containing a preponderating proportion of hydrogen.

4. The process which comprises conducting methane, together with oxygen mingled therewith in insufficient quantity to support combustion, through a discontinuous mass of resistance in an electric circuit and heated thereby, whereby the methane will be dissociated into carbon and a gas containing a preponderating amount of hydrogen.

5. The process which comprises subjecting a hydrocarbon fluid to a discontinuous mass of resistance in an electric circuit and heated thereby to a temperature sufficient to dissociate such fluid into carbon and a gas containing a preponderating proportion of hydrogen.

6. The process which comprises subjecting methane to a discontinuous mass of resistance in an electric circuit and heated thereby to a temperature sufficient to dissociate such methane into carbon and a gas containing a preponderating proportion of hydrogen.

In testimony whereof, I hereunto affix my signature.

JAMES R. ROSE.